UNITED STATES PATENT OFFICE.

CARL FRIEDRICH CLAUS, OF LONDON, ENGLAND.

OBTAINING SULPHUR FROM HYDROGEN SULPHIDE.

SPECIFICATION forming part of Letters Patent No. 349,931, dated September 28, 1886.

Application filed September 26, 1883. Serial No. 107,424. (No specimens.) Patented in England July 29, 1882, No. 3,608.

*To all whom it may concern:*

Be it known that I, CARL FRIEDRICH CLAUS, of London, England, chemist, have invented a new and useful Improved Process for Obtaining Sulphur from Sulphide of Hydrogen, (for which I have obtained a patent in Great Britain, No. 3,608, bearing date July 29, 1882,) of which the following is a specification.

My invention relates to the production or obtaining of sulphur from sulphide of hydrogen by processes in which the sulphide of hydrogen (or the gas containing the same) passes into and through layers of non-hydrated or anhydrous oxide of iron, while the said oxide of iron is kept in a heated condition. This process is especially intended for the production of sulphur from sulphide of hydrogen obtained from crude gas-liquor by the application of heat thereto, as described in the specification of British Letters Patent No. 1,369 of 1868, and mentioned in the specification of British Letters Patent No. 2,838 of 1881, or by the action of carbonic-acid gas, as described in the specification of British Letters Patent No. 4,644 of 1882; but the said process is also applicable to the recovery of sulphur from sulphide of hydrogen produced by the action of acids or of chloride of magnesium upon the sulphides of alkalies or of alkaline earths or the sulphides of metals.

Hydrated oxide of iron has been commonly used for the absorption of sulphide of hydrogen from gases containing the same, more especially in the purification of coal-gas. Such oxide of iron, after it has become "spent" and the sulphur is driven from it by heat, is converted into anhydrous oxide of iron, which is no longer applicable for the absorption of sulphide of hydrogen in the usual manner, and has, therefore, to be replaced by fresh hydrated oxide of iron. Now, according to a part of my present invention, the anhydrous oxide of iron may be used repeatedly for the absorption of fresh quantities of sulphide of hydrogen. I obtain this result by maintaining in the apparatus in which the anhydrous oxide of iron is exposed to the action of sulphide of hydrogen a temperature of not less than 200° or 220° Fahrenheit. A much higher temperature, though it will not prevent the absorption of the sulphur of sulphide of hydrogen, will not be so favorable to the satisfactory working of the process. When working in the above-described manner, the oxide of iron is changed into sulphide of iron, which I revivify in the ordinary manner by exposure to air. The sulphur is driven from it by the application of heat, or the sulphur is burned off from the sulphide of iron. The residual anhydrous oxide is used over again in the same manner.

The maintenance of the necessary temperature in the oxide of iron may obviously be effected in various ways—for instance, by the application of extraneous heat to the vessels containing the oxide of iron, or by heating the sulphide of hydrogen, or the gases containing the sulphide of hydrogen, to 200° or 212° Fahrenheit.

According to another part of my invention, I mix with the sulphide of hydrogen (or mixture of sulphide of hydrogen and other gases) a sufficient quantity of air to oxidize and combine with the hydrogen of the sulphide of hydrogen. In this manner sufficient heat is produced to keep the oxide of iron at a suitable temperature. The requisite quantity of air is added to the gases containing the sulphide of hydrogen previous to their entering the oxide of iron. The air so admitted may be used either hot or cold, according to the quantity of sulphide of hydrogen contained in the mixture of gases—that is to say, according to their richness in sulphide of hydrogen, or according to the initial temperature of the gases. Thus if sulphide of hydrogen not much diluted by other gases is passed into anhydrous oxide of iron, together with the requisite quantity of atmospheric air, (the oxide of iron at starting being heated to the required temperature—say to 220° or 300° Fahrenheit, or thereabout,) the gases, as well as the atmospheric air, may be passed without being heated into the vessel containing the oxide of iron. The chemical reaction taking place in the oxide will afterward, without extraneous heat, maintain for an almost unlimited time the required temperature, and will even increase it. If, however, the sulphide of hydrogen is much diluted, the necessary temperature must be maintained by the continuous application of extraneous heat, either to the oxide of iron, to the gases containing sulphide of hydrogen, or to the air to be admitted. The effect of this procedure is that the sulphide of hydrogen becomes converted into free sulphur, which, at the heat produced by the chemical reaction, passes in the free state in a continuous stream away from the oxide of iron, and in this state I collect the same in suitable chambers or vessels.

For carrying my invention into practice I find it advantageous to use an iron receptacle (lined with bricks) having a perforated false bottom on which a layer of oxide of iron is placed. The oxide may be the ordinary material now used in gas-works, in which case the operation may be commenced and continued without external heat; or it may be anhydrous oxide, in which case it must be heated to a temperature of, say, from 200° to 250° Fahrenheit at starting. The sulphur which leaves the oxide of iron is carried forward in a finely-divided state, and is, as already stated, deposited in suitable chambers.

What I claim is the above-described processes or operations for obtaining sulphur from sulphide of hydrogen—that is to say:

1. In the process of obtaining sulphur from sulphide of hydrogen, first heating anhydrous oxide of iron to a temperature not less than 200° Fahrenheit, and then introducing sulphide of hydrogen into the chamber containing the heated anhydrous oxide, the heat in the chamber being maintained from 200° Fahrenheit upward, as described, whereby sulphide of iron is formed, and then "burning" the iron, for the purposes set forth.

2. In the process of obtaining sulphur from sulphide of hydrogen, first heating anhydrous oxide of iron to a temperature not less than 200° Fahrenheit, then mixing sulphide of hydrogen with a chemical equivalent of atmospheric oxygen, and passing the same, either heated or cold, through the heated anhydrous oxide of iron, whereby the desired heat of the oxide is maintained and free sulphur is formed continuously without removal of the oxide of iron from the chamber, substantially as set forth.

In testimony whereof I have hereunto signed my name in the presence of two subscribing witnesses.

CARL FRIEDRICH CLAUS.

Witnesses:
  JOHN T. KNOWLES,
    8 *Southampton Buildings, London.*
  CHAS. BLENCOWE, Jr.